(12) United States Patent
Väänänen et al.

(10) Patent No.: US 7,998,894 B2
(45) Date of Patent: Aug. 16, 2011

(54) LIGAND MODIFIED ZIEGLER-NATTA CATALYST FOR OLEFIN (CO-)POLYMERIZATION

(75) Inventors: Marjo Väänänen, Helsinki (FI); Minna Stalhammar, Porvoo (FI); Young-Soo Ko, Taejon (KR); Siw Fredriksen, Skien (NO); Marita Savilahti, Riihimäki (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 12/373,499

(22) PCT Filed: Jul. 13, 2007

(86) PCT No.: PCT/EP2007/006247
§ 371 (c)(1),
(2), (4) Date: Apr. 2, 2009

(87) PCT Pub. No.: WO2008/006609
PCT Pub. Date: Jan. 17, 2008

(65) Prior Publication Data
US 2009/0292089 A1    Nov. 26, 2009

(30) Foreign Application Priority Data
Jul. 14, 2006    (EP) ..................................... 06014743

(51) Int. Cl.
*C08F 4/642* (2006.01)
*C08F 4/646* (2006.01)
*C08F 4/6592* (2006.01)

(52) U.S. Cl. ........ 502/115; 502/103; 502/104; 502/114; 502/152; 526/124.7; 526/160

(58) Field of Classification Search .................. 502/103, 502/104, 114, 115, 152; 526/124.7, 160
See application file for complete search history.

(56) References Cited

U.S. PATENT DOCUMENTS

| 5,925,587 | A | 7/1999 | Lee et al. |
| 6,156,854 | A * | 12/2000 | Shamshoum et al. .......... 526/81 |
| 2006/0111523 | A1 | 5/2006 | Garoff et al. |

FOREIGN PATENT DOCUMENTS

| DE | 2840115 | 3/1980 |
| DE | 282013 | 8/1990 |
| WO | 9837108 | 8/1998 |
| WO | 2001048037 | 7/2001 |

OTHER PUBLICATIONS

International Search Report dated Jan. 23, 2008 for PCT/EP2007/006247.
International Preliminary Examination Report on Patentability dated Jul. 22, 2009 for PCT/EP2007/00006247.
Written Opinion for PCT/EP2007/00006247.

* cited by examiner

*Primary Examiner* — Caixia Lu
(74) *Attorney, Agent, or Firm* — Milbank Tweed Hadley & McCloy, LLP

(57) ABSTRACT

The present invention relates to a Ziegler-Natta catalyst comprising a solid, ligand-modified catalyst component formed at least from
(a) a compound of Group 1 to 3 of the Periodic Table (IUPAC),
(b) a transition metal compound of Group 4 to 10 of the Periodic Table (IUPAC), or a compound of an actinide or lanthanide,
(c) one or more organic ligand compound(s) which is/are selected from organic compounds comprising a cyclopentadienyl anion backbone, and
(d) a compound of Group 13 of the Periodic Table,
wherein the catalyst component of said Ziegler-Natta catalyst is formed in an emulsion/solidification method, to a process for the production of such a catalyst, and to a process for the production of an olefin (co-)polymer in the presence of such a catalyst.

30 Claims, 4 Drawing Sheets

LIGAND MODIFIED ZIEGLER-NATTA CATALYST FOR OLEFIN (CO-)POLYMERIZATION

Figure 1:
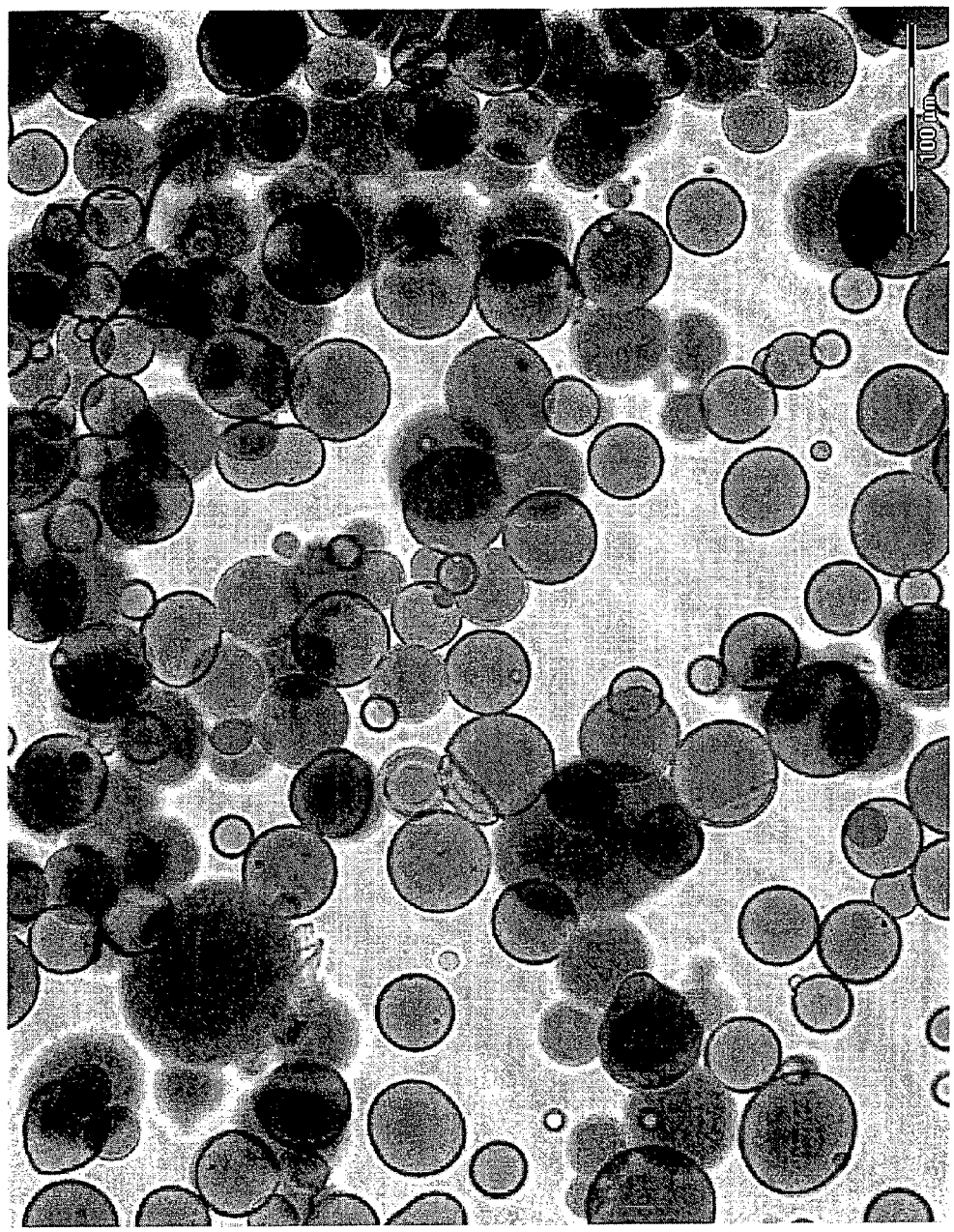

This application is based on International Application PCT/EP2007/006247 filed Jul. 13, 2007, which claims priority to European Patent Application No. 06014743.6 filed on Jul. 14, 2006, the disclosures of which are incorporated by reference herein in their entireties.

The properties of olefin (co-)polymers are i.a. determined by the catalyst used for their production. Thus, there is an ongoing need for olefin polymerisation catalysts which allow for the production of olefin (co-)polymers having improved and more controlled properties. In particular it is desirable that the catalyst allows for a "tailoring" of the properties of the produced resins.

Furthermore, in copolymers of olefin, for example copolymers of ethylene with other alpha-olefins, the distribution of the alpha-olefin comonomer units in the olefin, for example ethylene, copolymer is crucial because it determines the properties of the copolymer resin which, in turn, determine its applicability for commercial products.

A common process to produce olefin polymers and copolymers, for example ethylene (co)polymers is the polymerisation of the monomer units in the presence of a Ziegler-Natta catalyst. However, in case copolymers are produced, conventional types of Ziegler-Natta catalysts e.g. tend to produce copolymers with uneven or poor comonomer distribution (CD), which can be detected for example by TREF method, DSC or measuring the amount of xylene soluble polymer fraction. As a consequence of the uneven comonomer distribution, conventional olefin copolymers e.g. have a comparatively high degree of xylene solubles which is undesirable in many applications.

It is thus an object of the present invention to provide a Ziegler-Natta catalyst for the (co-)polymerisation of olefin, in particular ethylene, monomers with one or more other alpha-olefin comonomer units which allows for the production of olefin (co-)polymers with improved properties which can be "tailored". I.e. it is a target of the invention to provide a method, which allows polymer properties, like molecular weight, molecular weight distribution, copolymer distribution to be tailored. Especially the object of the invention is that the catalyst allows for the production of olefin copolymers, in particular ethylene copolymers, having an improved selectivity, which means an improved comonomer distribution, improved molecular weights of individual polymer fractions, comonomer contents in different polymer chains, side chain distribution in single polymer chains etc.

It has now surprisingly been found that these objects are achieved by a Ziegler-Natta catalyst, the solid catalyst component of which is produced in dispersion and which has been modified with an organic ligand.

Therefore, the present invention provides a Ziegler-Natta catalyst comprising a solid, ligand-modified catalyst component formed at least from
(a) a compound of Group 1 to 3 of the Periodic Table (IUPAC),
(b) a transition metal compound of Group 4 to 10 of the Periodic Table (IUPAC), or a compound of an actinide or lanthanide,
(c) one or more organic ligand compound(s) which is/are selected from organic compounds comprising a cyclo-penta-dienyl anion backbone and
(d) a compound of Group 13 of the Periodic Table (IUPAC), wherein the catalyst component of said Ziegler-Natta catalyst is formed by an emulsion/solidification method.

In the preparation of the catalyst of the present invention there is used no external carrier, such as silica or $MgCl_2$ based carriers, which are conventionally used carriers in Ziegler-Natta field.

It has been found that the catalysts of the invention allow for the production of olefin (co-)polymers the properties of which can be "tailored" and "fine tuned" by the use of the catalysts of the invention. The polymer properties can be tailored by selecting the ligand type to be used in the catalyst of the invention. In particular, the catalyst allows for the production of olefin, in particular ethylene, copolymers with improved properties such as an improved comonomer distribution, i.e. a more even comonomer distribution, as can be detected e.g. by TREF analyses.

From the TREF results, index CDBI (Composition Distribution Breadth Index) can be calculated which indicates the quality of the comonomer distribution. This method is a known method and described also in patent literature, see e.g. EP 0 598 848 of Exxon.

Composition or comonomer distribution (CD) refers to the distribution of comonomer between copolymer molecules and the distribution of comonomer within each polymer molecule. CD has effects on polymer properties, like crystallinity, optical properties, toughness, melt processability and many other properties as well.

The polymers which can be produced with the catalyst of the invention show an increased CD. As a consequence of the increased CD, even with reasonable high comonomer contents a decreased xylene solubles (XS) content can be achieved, which is believed to be caused by the improved comonomer distribution. It should be noted that the catalysts of the invention allow for the production of olefin, in particular ethylene, copolymers or copolymer fractions of e.g. a multimodal polymer resin, with a comparatively narrow molecular weight distribution.

The organic ligand (c) of the Ziegler-Natta catalyst of the invention originates from a compound having an organic ligand anion. The cationic part is preferably a metal, i.e. the compounds preferably are metal salts of an organic anions. The metals preferably are metals of Group 1 or 2, preferably Mg and Li metals, i.e. the compounds to be used in ligand modifying of the catalysts are preferably Li or Mg salts of organic ligand anions.

The organic ligand anion comprises a cyclopentadienyl hydrocarbon back-bone, which may contain heteroatoms such as N, P, O, S etc.

Said cyclopentadienyl hydrocarbon backbone can be a part of a fused hydrocarbon ring system. As examples of that type of ring systems can mentioned e.g. pentalenyl, indenyl, atsulenyl, indasenyl, asenaphtylenyl or fluorenyl compounds. All hydrocarbons backbones can be in substituted or unsubstituted form.

For example, the organic ligand anion may be a substituted or unsubstituted cyclopentadienyl, a substituted or unsubstituted indenyl or a substituted or unsubstituted fluorenyl compound.

The optional one or more substituent(s), are independently selected preferably from halogen, hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl, $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OsiR"$_3$, —SR", —PR"$_2$ or —NR"$_2$, each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom wherein they are attached to.

Examples of the organic ligand anions comprise cyclopolyenyls or substituted cyclopolyenyls having 5 to 24 carbon atoms such as cyclopentadienyl, methylcyclopentadienyl, ethylcyclopentadienyl, t-butylcyclopentadienyl, hexylcyclopentadienyl, octylcyclopentadienyl, 1,2-dimethylcyclopentadienyl, 1,3-dimethylcyclopentadienyl, 1,2,4-trimethylcyclopentadienyl, 1,2,3,4-tetramethylcyclopentadienyl, pentamethylcyclopentadienyl, indenyl, 4-methyl-1-indenyl, 4,7-dimethylindenyl, 4,5,6,7-tetrahydroindenyl, fluorenyl or methylfluorenyl, 2,3-dimethyl-dimethyl-t-butyl-siloxycyclopentadienyl.

Specific examples of useful Mg and Li ligand compounds are biscyclopentadienylMg, cyclopentadienylLi, indenylLi, 2,3-dimethyl-dimethyl-t-butyl-siloxycyclopentadienyl and fluorenylLi ligand compounds.

Depending on the desired polymer properties, e.g. of ethylene copolymer properties, the metal and ligand parts of the ligand compound can be selected accordingly. In addition, the amount of ligand in the catalyst has effect on the polymer properties. Especially MWD, comonomer distribution, and thus XS, M, are properties, which can be tailored by using the catalysts of the invention.

Preferably, the molar ratio of ligand to transition metal in the catalyst is 0.03 to 5, more preferably is from 0.05 to 3, still more preferably from 0.07 to 2. The optimum ratio of ligand to transition metal is dependent on the ligand compound and on the desired polymer properties. The following ranges are just examples of ranges to achieve some properties, however, they should not be considered as restrictive ranges. If e.g. narrow MWD and low XS are desired a useful ratio of Li ligands, such as indenylLi, fluorenylLi and cyclopentadienylLi preferably is in the range of 0.2 to 0.6, and e.g. that of the Mg ligands, such as Cp$_2$Mg, the preferred range is from 0.25 to 1.2.

Further, it can be noted that with very small amounts of some ligands, e.g. with ligand/metal ratio less than 0.15, the effect of ligand on some polymer properties is rather small.

The molar ratio is to be calculated between the organic ligand anion as such and the transition metal atoms. This means, for example, that if a bisligandMg compound (e.g. biscyclopentadienylMg, Cp$_2$Mg) is used in the preparation of the catalyst this compound contains 2 moles of ligand (e.g. cyclopentadiene).

As stated above, the catalyst of the invention is a Ziegler-Natta (ZN) type polyolefin catalyst. Such catalysts are well known in the field of polymers. Generally, they comprise at least a catalyst component formed at least from a metal compound of Group 1 to 3 (a), a transition metal compound of Group 4 to 10, or a compound of actinide or lanthanide (b), and optionally a compound of Group 13 (d) of the Periodic Table (IUPAC, Nomenclature of Inorganic Chemistry, 1989). (a), (b) and (d) refer to the compounds present as well in the catalyst of the present invention.

Optionally, further components may be present in the catalyst component, e.g. an internal donor compound. ZN catalysts may also comprise further catalyst component(s), such as a cocatalyst and/or an external donor.

Examples of different combinations of components (a), (b) and (d) used in conventional supported Ziegler Natta catalyst are disclosed among others, in the examples of WO 95/35323. Said combinations are in general applicable as well to the present invention.

As stated, ZN catalysts of the invention comprise a catalyst component formed from at least (a) a compound of a metal of Group 1 to 3, preferably a compound of Mg, (b) a compound of a transition metal comprising a compound of a metal of Group 4 to 10 or an actinide or lanthanide, more preferably a compound of metal of Group 4 to 6 of the Periodic System, (c) one or more organic ligand compound(s) which is/are selected from organic compounds comprising a cyclopentadienyl anion backbone, preferably Group 1 or 2 metal salts of organic ligand anions comprising said cyclopentadienyl anion backbone, and (d) a compound of Group 13 metal, which is preferably an Al compound.

Preferably, the transition metal is a selected from Ti, Hf or Zr, most preferably it is Ti. Especially preferably, the Ti compound is a titanium halide, more preferably Ti tetrachloride, a compound of magnesium is preferably a Mg compound or complex with alkoxy, ether, alkyl and/or halide groups. The compound of Group 13 metal is preferably an organoaluminium compound, more preferably an aluminium alkyl halide, aluminium alkyl or aluminium halide compound.

It is also possible to use in addition to the above-mentioned compounds additional co-activators, modifiers and the like in catalyst preparation. Thus, two or more aluminium compounds may be used, or the catalyst compounds may be combined with different types of ethers, esters, silicon ethers and the like to further modify the activity and/or the selectivity of the catalyst, as is known in the art. It has to be noted that the ligand salt used in the catalyst preparation is not to be considered to be a separate reactive compound, but the anionic ligand part will as such form a part of the catalyst forming compounds.

As stated above, catalysts can comprise in addition to the catalyst component cocatalysts. Useful cocatalysts are, among others, aluminium alkyls, aluminium alkyl halides and aluminium alkoxy compounds. Especially preferred cocatalysts are aluminium alkyls, in particular aluminium trialkyls, such as trimethyl aluminium, triethyl aluminium and tri-isobutyl aluminium.

Cocatalyst(s) are usually fed separately to the actual polymerization step. The cocatalyst is typically used in excess to the transition metal of the transition metal compound. For instance, when an aluminium alkyl is used as a cocatalyst-, the molar ratio of the aluminium in the cocatalyst to the transition metal in the transition metal component is from 1 to 500 mol/mol, preferably from 2 to 100 mol/mol, more preferably from 5 to 50 mol/mol and in particular from 10 to 30 mol/mol.

The catalyst component formed from at least compounds (a), (b) and (d) as well from the ligand compound (c), is prepared in an emulsion/solidification method, such as disclosed in general in WO 03/106510 of Borealis, e.g. according to the principles given in the claims thereof. However, said WO document is totally silent on catalysts modified with organic ligands. The content of this document in its entirety is incorporated herein by reference, in particular concerning the general and all preferred embodiments of the catalysts described therein as well as the methods for the production of the catalysts.

In a preferred embodiment, in the Ziegler-Natta catalyst of the invention compound (b) is a transition metal compound of Group 4 to 6 of the Periodic Table (IUPAC), and compound d) is an organoaluminium compound.

More preferably, in the catalyst of the invention, compound (a) is a magnesium compound, compound (b) is a chlorine-containing transition metal compound of Group 4 to 10 of the Periodic Table (IUPAC), more preferably is TiCl$_4$, compound (d) is an Al compound having the formula Al(alkyl)$_x$C$_{3-x}$, where alkyl is an alkyl group with 1 to 12, preferably 1 to 8, more preferably 1 to 6 C atoms and $0 \leq x \leq 3$, preferably x is 1 or 2.

The ligand modified catalyst comprises a catalyst component which is prepared in an emulsion/solidification method which preferably comprises:
- preparing a common solution of compounds (a), (b) and (d) or separate solutions comprising one or more of compounds (a), (b) and (d),
- dispersing said solution(s) in a solvent immiscible therewith and inert in relation to said compounds, to obtain an emulsion in which said solution(s) form(s) the dispersed phase in the form of droplets comprising compounds (a), (b) and (d),
- solidifying the catalyst compounds in the dispersed droplets and
- adding one or more ligand compound(s) (c) which is/are selected from organic compounds comprising a cyclopentadienyl anion backbone at any stage of the preparation into the dispersed phase before or after the solidification step.

Optionally, the obtained solidified catalyst compounds particles may be recovered.

The solidified catalyst particles can be washed before the final recovery.

In the formation of the catalyst component of the Ziegler-Natta catalyst of the invention compound c) may be added at any stage of the catalyst component preparation.

Such processes enable to create novel catalysts, which are able to produce polymers with tailored properties and further having specific, desired properties as described in this specification. Further, such processes enable to create the morphology of the final catalyst in situ during the solidification step of the catalyst component(s). Thus, a controlled method is provided to obtain active catalyst particles with highly preferable morphology, e.g. with a predetermined spherical shape, uniform particle size distribution without using any added external porous support material, such as an inorganic oxide, e.g. silica. Also desirable surface properties can be obtained.

Thus, the combination of the catalysts chemistry of the present invention and excellent and unique morphology properties of the catalyst will result in a catalyst, which is usable in olefin polymerisation and especially in ethylene copolymerisation process to produce ethylene copolymer having improved properties, especially improved composition distribution, i.e. comonomer distribution inside the single polymer chains, molecular weight distribution, similar comonomer contents in separate polymer chains, etc.

The embodiments described below pertain to any of the above described embodiments of the preferred method for preparing the catalyst component.

In the method for forming the catalyst component, the compounds (a), (b), (c) and (d), may be combined into one solution which is dispersed in the immiscible solvent, or, alternatively, at least two separate solutions for each or part of said compounds may be prepared, which are then dispersed successively to the immiscible solvent.

The ligand compound (c) may be added at any stage in the preparation of the catalyst before the final recovery of the catalyst. The ligand compound may be mixed together with the solutions of compounds (a), (b) or (d) and then dispersed in the immiscible solvent, or as stated above, it can be added during or after the solidification step, e.g. during the washing step before the final recovery.

However, most preferably, the ligand (c) is combined with the Group 13 compound (d) into one solution, which is added to the first solvent at any step before the final recovery.

The term "to a first solvent immiscible therewith and inert in relation to said compounds" means herein that said solvent forming the continuous phase is chemically inert. Preferably, the solvent of said continuous phase does not contain dissolved therein any significant amounts of catalyst forming compounds (a), (b), (c) or (d). Thus, the solid particles of the catalyst are formed in the droplets from the compounds which originate from the dispersed phase (i.e. are provided to the emulsion in a solution dispersed into the continuous phase).

The term "emulsion" used herein covers both bi- and multiphasic systems.

As stated above, before the final recovery step the solid catalyst particles may be washed. The washed solid particles can be isolated and dried in a manner known in the art to obtain said catalyst as dried particulate solids. Another alternative is to slurry the solid catalyst particles after washing into an oily liquid to get a catalyst-oil-slurry, which can be used as such in polymerisation. By this method the drying step can be avoided. Drying step can in some cases have undesired effects on the catalyst morphology. The oily liquid comprises oil, petroleum or hydrocarbons or mixtures thereof, preferably hydrocarbon oils, such as white oils, which are mixtures of paraffinic and naphtenic hydrocarbons.

According to a an embodiment the catalyst component of the Ziegler-Natta catalyst of the invention is prepared by a method comprising the steps
- preparing a common solution of compounds (a), (b) and (d) or separate solutions comprising one or more of compounds (a), (b) and (d),
- dispersing said solution(s) to a first solvent immiscible therewith and inert in relation to said compounds, to obtain an emulsion in which said solution(s) form(s) the dispersed phase in the form of droplets,
- solidifying the catalyst compounds in the droplets, and
- washing the solidified catalyst particles and adding the ligand compound (c) during the washing step,
- recovering the solid catalyst component particles.

According to a preferred embodiment the catalyst component of the Ziegler-Natta catalyst of the invention is prepared by a method comprising the steps
- preparing a solution of the compound (a);
- a preparing a solution of compounds (d) and (c)
- combining said two solutions with a solution of compound (b)
- dispersing said obtained combined solution of (a), (b), (c) and (d) in the first solvent immiscible therewith and inert in relation to said compounds to obtain an emulsion in which said solutions form the dispersed phase;
- solidifying the catalyst component in the dispersed droplets;
- a optionally washing the solidified catalyst particles
- recovering the solidified catalyst particles in solid form According to an even more preferred embodiment the catalyst component of the Ziegler-Natta catalyst of the invention is formed in a process comprising:
- preparing a solution from said compound (a);
- preparing a solution of compound (d) and (c),
- combining said solutions of compounds (a) and (d) with (c)
- dispersing said combined solution of (a), (c) and (d) to the first solvent immiscible therewith and inert in relation to the compounds;
- adding a solution of compound (b) to the dispersed solution; and
- solidifying a catalyst component in the dispersed droplets, optionally washing the solidified catalyst particles
- recovering the solidified catalyst droplets in solid form In a preferred embodiment of all the preparation alternatives, the catalyst particles are washed before the final recovery.

In one embodiment said catalyst component may be formed, in addition to above said compounds, also from further compounds, which can be added to the solution of the catalyst component forming compounds before or after the dispersing step. Such further compounds may be those conventionally used in the art.

Furthermore, in addition to the catalyst component as defined above, the catalyst of the invention may comprise further catalyst component(s), such as a cocatalyst known in the art. The further catalyst component(s) are usually added separately with the catalyst of the invention at the actual polymerisation or prepolymerisation step.

The solution to be dispersed into the immiscible solvent can be any solution prepared from the catalyst component(s) forming compounds, provided that it is in a form of a liquid when dispersed into the continuous phase. Said term "solution" is understood herein broadly to include solutions prepared from (i) one or more catalyst forming compound in liquid form, (ii) from a second inert solvent, and/or (iii) a melt of said compound(s); as described herein below.

In case of a second inert solvent, any suitable solvent which dissolves said compounds may be used, preferably an organic solvent including linear or branched aliphatic, alicyclic and aromatic hydrocarbons, suitably an aliphatic or aromatic hydrocarbon, e.g. pentane, hexane, heptane, toluene, benzene etc, preferably aromatic hydrocarbon, most preferably toluene. A mixture of second solvents may also be used, provided that said mixture dissolves the compounds and is immiscible with the continuous phase at least during the emulsion formation step.

The first solvent used to form the continuous phase is chosen, as stated above, to be inert, and also immiscible with the solution to be dispersed at least at the conditions (e.g. temperature) used during the dispersing step. Said first solvent may also be a mixture of one or more solvents. Furthermore, the solvent is chosen so that the compounds and possible intermediate(s) thereof which form the solidifying catalyst component(s), as well as the solidified catalyst, are practically insoluble or only poorly soluble to the continuous phase.

In a preferred embodiment said solvent forming the continuous phase is an inert solvent including halogenated organic solvents, preferably fluorinated organic solvents and particularly semi, highly or perfluorinated organic solvents and functionalised derivatives thereof, which means that said solvents may contain other functional groups and/or further halogens such as chlorine, bromine and/or iodine.

Examples of the above-mentioned solvents are semi, highly or perfluorinated hydrocarbons, such as alkanes, alkenes and cycloalkanes, ethers, e.g. perfluorinated ethers and amines, particularly tertiary amines, and functionalised derivatives thereof. Preferred are semi, highly or perfluorinated, particularly perfluorinated hydrocarbons, e.g. perfluorohydrocarbons of e.g. C3-C30, such as C4-C10. Specific examples of suitable perfluoroalkanes and -cycloalkanes include perfluorohexane, -heptane, -octane and -(methylcyclohexane). Semi fluorinated hydrocarbons relates particularly to semifluorinated n-alkanes, such as perfluoroalkylalkane.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. See the articles of A. Enders and G. Maas in "Chemie in unserer Zeit", 34. Jahrg. 2000, Nr. 6, and of Pierandrea Lo Nostro in "Advances in Colloid and Interface Science", 56 (1995) 245-287, Elsevier Science The emulsion can be formed by any means known in the art: by mixing, such as by stirring said solution vigorously to said solvent forming the continuous phase or by means of mixing mills, or by means of ultra sonic wave. A further possibility is to use a so called phase change method for preparing the emulsion by first forming a homogeneous system which is then transferred by changing the temperature of the system to a biphasic system so that droplets will be formed. If needed, part of the catalyst forming compounds may be added after the emulsion system is formed.

The emulsion formation via "one phase" change may be one preferable method, especially when e.g. fluorinated solvents are used as the continuous phase, since the miscibility of the fluorinated solvents, in particular perfluorinated solvents, with common organic solvents (e.g. alkane, such as pentane, hexane, chloroform, toluene) is dependent on the temperature so that a one phase system (homogeneous phase) of the fluorous solvent and a common organic solvent can be formed above a certain critical temperature.

The two phase state is maintained during the emulsion formation step and the solidification step, as, for example, by appropriate stirring.

The ratio of catalyst component(s) forming solution and the first solvent immiscible therewith is chosen so that the first solution forms the discontinuous phase (droplets) in the bi- or multiphase system.

Additionally, emulsifying agents/emulsion stabilisers can be used, preferably in a manner known in the art, for facilitating the formation and/or stability of the emulsion. For the said purposes e.g. surfactants, e.g. a class based on hydrocarbons (including polymeric hydrocarbons with a molecular weight e.g. up to 10 000 and optionally interrupted with a heteroatom(s)), preferably halogenated hydrocarbons, such as semi- or highly fluorinated hydrocarbons optionally having a functional group selected e.g. from —OH, —SH, $NH_2$, —COOH, —$COONH_2$, cyclic ethers and/or any reactive derivative of these groups, like alkoxy or carboxylic acid alkyl ester groups, or, preferably semi-, highly- or perfluorinated hydrocarbons having a functionalised terminal, can be used.

Alternatively, an emulsifying and/or emulsion stabilising aid can also be formed by reacting a surfactant precursor bearing at least one functional group with a compound reactive with said functional group and present in the catalyst solution or in the solvent forming the continuous phase. The obtained reaction product acts as the actual emulsifying aid and or stabiliser in the formed emulsion system.

Examples of the surfactant precursors usable for forming said reaction product include e.g. known surfactants which bear at least one functional group selected e.g. from —OH, —SH, $NH_2$, —COOH, —$COONH_2$, cyclic ethers with 3 to 5 ring atoms, and/or any reactive derivative of these groups, like alkoxy or carboxylic acid alkyl ester groups; e.g. semi-, highly or perfluorinated hydrocarbons bearing one or more of said functional groups. Preferably, the surfactant precursor has a terminal functionality as defined above.

The compound reacting with such surfactant precursor is preferably contained in the catalyst solution and may be a further additive or one or more of the catalyst forming compounds. Such compound is e.g. a compound of group 13 (e.g. a compound (d) as defined below) and/or a transition compound (e.g. a compound (b) as defined below).

The addition of the surfactant precursor can be effected before or after the dispersing step, suitably after the dispersing step of part or all, preferably all, of the catalyst forming compounds. In a preferred embodiment a highly fluorinated $C_{1-n}$— (suitably $C_{4-30}$— or $C_{5-15}$—) alcohol (e.g. highly fluorinated heptanol, octanol or nonanol) is added to a solution of a compound (a), compound (b), (d) and/or (c) to form the "actual" surfactant. The addition is preferably effected after a solution of compounds (a), (c), (d) and (b) as defined below, is dispersed to a solvent forming the continuous phase.

These and any further additives, and/or compounds can be added to the system in any stage of the dispersing and/or solidification step, if needed.

The droplet size and size distribution of the formed discontinuous phase can be selected or controlled in a manner known in the art, i.a. by the choice of the device for emulsion formation and by the energy put into emulsification.

In the preparation process of the invention the solution may already contain all the compounds (to be added) before the dispersing step thereof. Alternatively, e.g. depending on the reactivity of the compounds, the dispersed phase can be formed first from one or more of the compounds and, thereafter, the other compound(s) can be added separately to said dispersed phase. Said other compounds can be added in a form of a solution or already in a form of an emulsion. Portion-wise additions of the dispersed phase are also possible.

The solidification of the catalyst component(s) in the dispersed droplets can be effected in various ways, e.g. by causing or accelerating the formation of said solid catalyst forming reaction products of the compounds present in the droplets. This can be effected, depending on the used compounds and/or the desired solidification rate, with or without an external stimulus, such as a temperature change of the system.

In a further embodiment, the solidification reactions of the compounds are started after the formation of the emulsion system. Accordingly, a solution of one or more of the starting compounds of a catalyst component(s) is first dispersed into the inert, immiscible solvent, and thereafter, the other(s) of the starting compounds is added to said first dispersed phase, whereafter the solidification reactions starts therein. Again, heating or cooling can be used during and/or after such additions.

Alternatively the solidification may be effected (or accelerated) by removing the solvent from the droplets or in case of a molten liquid catalyst by cooling the system.

The solidification may also be controlled by the reaction time.

The system may be heated gradually, up to 10° C. per minute, preferably 0.5 to 6° C. per minute and more preferably 1 to 5° C. per minute.

Alternatively, if desired, the emulsion system may be subjected to a very rapid temperature change to cause a fast/immediate (e.g. in 0.1 to 10 s, such as in few seconds) solidification in the dispersed system.

The appropriate temperature change, i.e. an increase or a decrease in the temperature of an emulsion system, required for the desired solidification rate of the components cannot be limited to any specific range, but naturally depends on the emulsion system, i.a. on the used compounds and the concentrations/ratios thereof and/or on the used solvents, and is chosen accordingly. Temperature difference of e.g. 5 to 100° C., such as 10 to 100° C., or 20 to 90° C., such as 50 to 80° C., e.g. 70 to 80° C. can be used. It is also evident that any techniques may be used to provide sufficient heating or cooling effect to the dispersed system to cause the desired solidification.

In one embodiment the heat treatment is effected by bringing, e.g. dispersing, such as spraying or preferably siphoning, the emulsion system to an inert receiving medium. The temperature of the receiving system can be significantly higher than that of the emulsion to cause an instant solidification of the reaction product in the droplets. The receiving medium can be gaseous, e.g. air, or a liquid, preferably a solvent, and suitably the same as used as the continuous phase in the formation of the emulsion. Thus e.g. a perfluorinated hydrocarbon as defined above or a mixture thereof with other solvents, e.g. with an aliphatic or aromatic hydrocarbon as defined above, can be used. Preferably the receiving medium is mixed during the siphoning step. The siphoning techniques are known in the art.

Preferably the "phase change" as used for forming an emulsion can also be utilised for solidifying the catalytically active contents within the droplets of an emulsion system by, again, effecting a temperature change in the dispersed system, whereby the solvent used in the droplets becomes miscible with the continuous phase, e.g. with the fluorous continuous phase as defined above, so that the droplets become impoverished of the solvent and the solidifying components remaining in the "droplets" start to solidify. Thus the immiscibility can be adjusted with respect to the solvents and conditions (temperature) to control the solidification step The miscibility of e.g. fluorous solvents with organic solvents can be found from the literature and be chosen accordingly by a skilled person. Also the critical temperatures needed for the phase change are available from the literature or can be determined using methods known in the art, e.g. the Hildebrand-Scatchard-Theorie. Reference is also made to the articles of A. Enders and G. and of Pierandrea Lo Nostro cited above.

Thus, the entire droplet or only part of the droplet may be converted to a solid form. The size of the "solidified" droplet may thus be smaller or greater than that of the original droplet, if e.g. the amount of the monomer used for the prepolymerisation is relatively large.

The solidified catalyst particles may be subjected to washing step(s).

The droplet shape of the particles may be substantially maintained. The formed particles may have an average size range of 1 to 500 μm, e.g. 5 to 500 μm, advantageously 5 to 200 μm or 10 to 150 μm. Even an average size range of 5 to 60 μm is possible. The size may be chosen depending on the polymerisation the catalyst is used for. Advantageously, the particles are essentially spherical in shape, they have a low porosity and a low surface area.

The various possibilities of the compounds and combinations are within the skills of a person in the field. Accordingly, the solution of catalyst forming compounds can be formed by contacting:

a. Compound (a): at least one compound of Group 1 to 3, preferably Group 2, of the Periodic Table (IUPAC), such as a Mg compound, having a general formula selected from:

$$Mg[(A-R^1)_y\!-\!(B\!-\!R^2)_z]_{2-n}X_n \qquad (I),$$

wherein each A and B may be same or different comprising O, S, N, P, y and z may the same or different and being 0 or 1, with the proviso that both y and z can be not be 0; each X is independently a halogen, preferably chlorine; $0 \leq n \leq 2$ and n may or may not be an integer; each $R^1$ and $R^2$ is independently a $C_{1-20}$ hydrocarbon residue, e.g. $C_{1-15}$ group, preferably $C_{3-10}$ group, such as $C_{4-8}$ group, e.g. linear, cyclic or branched alkyl, aryl, aralkyl, or alkaryl, suitably a linear or branched alkyl, preferably a branched alkyl, such as 2-ethyl-1-hexyl, or ethyl, propyl, butyl, pentyl, hexyl, heptyl, octyl, which may optionally be substituted with halogen, or if both y and z are 1, then either $R^1$ or $R^2$ is a —$(CH_2)_v$— group, optionally substituted, where v is an integer 1 to 8, preferably 1 to 4, more preferably 1 or 2. In one preferred compound of formula I both A and B are O, y and z are 1, each $R^1$ and $R^2$ are hydrocarbon residues with 1 to 3 C atoms, n is 0 or 1.

$$Mg[(A-R^1)_y\text{—}(B\text{—}R^2)_z]_{2-n}(R^3)_n \qquad (II),$$

wherein each A, B, $R^1$ and $R^2$ and n, y and z are as defined above in formula (I);

each $R^3$ is independently a hydrocarbon residue as defined for $R^1$ and $R^2$, e.g. linear or branched alkyl, such as ethyl, propyl, butyl, pentyl, hexyl, heptyl, octyl. Preferably $0 \leq n < 2$.

In a preferred embodiment of the invention, said compound (a) is a magnesium hydrocarbyloxy compound of formula $Mg(OR^1)_{2-n}(R^3)_n$ (II), wherein each $R^1$ and $R^3$ are independently as defined above; and $0 \leq n < 2$, which may be commercially available or, preferably, can be prepared as described below by contacting a magnesium alkyl compound of formula $Mg(R^3)_2$ (VII), wherein each $R^3$ is independently as defined above, with an alcohol $R^1OH$, wherein $R^1$ is as defined above;

$MgX_2 \cdot mTi(OR^1)_4$ (III), wherein each X and $R^1$ are independently as described above in formula (I); $0.1 \leq m \leq 3$; and/or complexes of $MgX_2$ with electron-donor compounds;

b. Compound (b): with at least one transition metal compound of Group 4 to 10, or a compound of lanthanide or actinide, preferably a transition compound of Group 4 to 6, more preferably of Group 4, of the Periodic Table (IUPAC), such as a Ti compound, wherein, particularly preferred, a tetravalent Ti compound can be used, and examples of such compounds are:

$TiX_4$ (IV), wherein each X is independently as defined above in formula (I), such as Cl;

$Ti(OR^1)_{4-p}X_p$ (V), wherein each X and $R^1$ are independently as defined above in formula (I)

p is 0, 1, 2 or 3;

d. Compound (d): with at least one compound of Group 13 of the Periodic Table (IUPAC), preferably an aluminium compound, such as $Al(alkyl)_xX_{3-x}$ (VI), wherein alkyl is an alkyl group of 1 to 12 C atoms, preferably 1 to 8 C atoms, more preferably 1 to 6 C atoms and X is halide, preferably chloride, and are independently selected and $0 \leq x \leq 3$; e.g. dimethyl aluminium chloride, diethyl aluminium chloride, diisobutyl aluminium chloride, ethyl aluminium dichloride, and methyl aluminium dichloride, triethylaluminium, and c. Ligand forming compounds are selected from organic compounds comprising cyclopentadienyl anion backbone as defined above.

As mentioned above the solid catalyst particles of the catalyst component may contain further component(s), such as additional Group 13 compounds, additional modifiers. Further, the Ziegler-Natta catalysts can additionally contain further catalyst components, such as cocatalysts, e.g. conventional compounds of Group 13 of the Periodic Table (IUPAC), e.g. organo aluminium, such as aluminium alkyl compounds (e.g. triethylaluminium) compounds. These components are usually added during the polymerisation stage.

It is also possible to include other catalyst component(s) than said ZN components to the catalyst of the invention.

The used amounts/ratios of the compounds to keep the made catalyst composition in liquid state during the emulsion formation step are also within the skills of a person in the field.

The preparation of the solution may also result in a bi- or multiphase liquid/liquid form already in the preparation step of said solution. Such system can be subjected as such to the solidification step or added to an immiscible solvent of the invention as such or after the separation of the catalyst forming phase.

In the numbered embodiments described below, preferably the Compounds (a), (b), (c) and (d) are as defined above:

1. A solution of Compounds (a), (b), (c) and (d) is dispersed to an immiscible solvent; and the catalyst component is solidified in the dispersed droplet phase. Said catalyst solution is prepared by forming a solution of Compound (a); adding to said solution separately first Compound (d) together with (c), preferably in a form of a solution, and then Compound (b), preferably in a form of a solution.

The formation of solution of (a) and (d) with (c) can be effected at a temperature of 0-100° C., e.g. at 20-80° C. Preferably, the compound (b) is added at a lower temperature, e.g. at 0-30° C. The dispersion step may be effected at 0-100° C., e.g. at about 0-70° C., such as at 0-30° C.; or 2. A solution of Compound (a), combined with a solution of Compound (d) with Compound (c), is prepared and dispersed to an immiscible solvent; then a solution of Compound (b) is added to the dispersed phase; and the catalyst component is solidified in the dispersed droplet phase.

In case Compound (d) with Compound (c) is added to a solution of Compound (a), then Compounds (d) and (c) can be added to the solution of (a) before or after, preferably before, said dispersion step of the solution of Compound (a). Suitably, Compound (b) is added as a solution to the dispersed phase of Compound (a) containing Compound (d) and (c). Alternatively, a separate emulsion can also be formed from Compound (b), which is then added to said emulsion of Compound (a) and, of Compound (d) and (c). The solution and the dispersion formation steps can be effected at the temperatures indicated above in the embodiment (1); or In every preparation method as described above the compounds (a), (b), and (d) may be added in molar ratios known in the art, e.g in molar ratio of the element of Compound (d), e.g. Al, to the element of Compound (a), e.g. Mg, may be between 0.3:1 to 3:1, e.g. 0.5:1 to 2:1, the molar ratio of the element of Compound (b), e.g. Ti, to the element of compound (a), e.g. Mg, may be between 3:1 to 0.1:1, e.g. 2:1 to 0.2:1.

It has been noted that by increasing the catalyst dispersion phase over the continuous phase the catalyst yield can be improved a lot, and still keep the catalyst morphology as perfect round shaped. However, there is some upper limit to the proportion of the dispersion phase, where the increase of the dispersion phase will not anymore give essential further increase and further, the catalyst will also loose its excellent morphology. It has been found that if the proportion of the dispersed phase is increased from about 15% (vol.-% of the total emulsion system) up to about 60%, the yield was improved about 60%, and still the catalyst morphology was perfect round shaped. However, if the proportion of the dispersion was increased above up to 65% or above the catalyst will loose its nice morphology.

A preferred portion of the dispersed phase is 18 to 60 vol.-%, more preferably 18 to 56 vol.-%, still more preferably 18 to 50 vol.-%.

As the continuous phase a fluorinated solvent or a mixture thereof as defined above is preferably used.

An emulsifying agent, such as a surfactant as defined above, is suitably used and this may be added to a catalyst solution or a continuous phase before or after the dispersing step. Preferably, a highly fluorinated alkanol as defined above may be added e.g. to the formed emulsion as the surfactant precursor as defined above.

As pointed out above, said emulsifying and/or emulsion stabilising aid can be formed by reacting a surfactant precursor bearing at least one functional group with a compound reactive with said functional group and present in the catalyst solution or in the solvent forming the continuous phase. The obtained reaction product acts as the actual emulsifying aid and or stabiliser in the formed emulsion system.

In the specific embodiments below, preferable compounds (a), (b) and (d) as defined above have been indicated, wherein each "hydrocarbyl" means independently as under "$R_2$" above; each "alkyl" as such or as part of "alkoxy" means independently as defined under "$R^1$" above.

In one embodiment, the liquid catalyst is prepared by contacting a magnesium dihydrocarbyl compound, e.g. magnesium dialkyl, such as butyloctyl-Mg (BOMAG), with an alcohol $R^1OH$, wherein $R^1$ is as defined above, e.g. 2-ethyl-1-hexanol. To this solution an aluminium compound of formula $Al(R^1)_xX_{3-x}$, wherein $R^1$, X and x are as defined above, preferably Al alkyl halide (e.g. chloride), such as $EtAlCl_2$, into which solution the ligand compound, as defined above, is added and further a titanium compound, such as $TiCl_4$, is added to the obtained solution. In case both the Al and the Ti compounds are added to Mg—$R^1OH$ complex, then preferably the Al compound and ligand compound are added first. The solution may contain additional solvents as described above, e.g. an aliphatic or aromatic solvent, such as n-heptane or toluene. Said solution can be formed at a temperature range at 10-50° C., preferably at the ambient temperature at 10 to 30° C. The obtained solution is then dispersed, e.g. by mixing, to an immiscible solvent, e.g. to a perfluorinated hydrocarbon as defined above. The mixing is suitably carried out at room temperature, but e.g. lower or elevated temperatures may also be used.

To the obtained dispersion an emulsifying agent as defined above, such as a highly or perfluorinated hydrocarbon having a functional terminal, may be added to improve/stabilise the droplet formation. The solidification of the catalyst component in the droplets is preferably effected by raising the temperature of the mixture gradually, e.g. from the room temperature up to 100° C., e.g. up to 60-90° C., in 1 to 180 minutes, e.g. 1-90 or 5-30 minutes. Heating time is dependent on the size of the reactor. Preferably, the gradual heating comprises a temperature change treatment comprising subjecting the emulsion to gradual temperature change of up to 10° C. per minute, preferably 0.5 to 6° C. per minute and more preferably 1 to 5° C. per minute.

In a further embodiment, a magnesium alkyl, as defined above is reacted with $R^1OH$ as defined above, preferably in a solvent, like toluene and, an aluminium compound, such as an alkyl aluminium halide, e.g. $EtAlCl_2$, preferable dissolved in a solvent, like toluene, combined with a ligand compound is added, to form a first solution, which is dispersed to an inert solvent, such as perfluorinated hydrocarbon as defined above. To the obtained dispersed phase, $TiCl_4$ solution is then added separately. After the addition of $TiCl_4$ the solidification of the droplets of the dispersed phase is carried out by heating as described above and the solidified catalyst is optionally washed and recovered as described above. This embodiment, where $TiCl_4$ is added separately, is the preferred one. Additional inert solvents as defined above can also be used in the formation of said solutions.

In the above embodiments it is described as preferred embodiment that ligand compound is combined with the solution of Al compound. However, as disclosed earlier in this application, it is also possible to add the ligand compound separately at any step of the catalyst preparation, but before the final recovery of the catalyst, e.g. during the washing step.

During the solidification step, which is preferably carried out at about 60 to 80° C., preferably at about 70 to 80° C., the solvents may preferably be removed and optionally the solids are washed with a wash solution, which can be any solvent or mixture of solvents such as those defined above and/or used in the art, preferably a hydrocarbon, such as pentane, hexane or heptane, suitably heptane. The washed catalyst can be dried or it can be slurried into an oil and used as a catalyst-oil slurry in polymerisation process.

Generally, in the final solid catalyst particles, the molar ratio of Mg:Ti can be e.g. between 10:1 to 1:10, preferably 7:1 to 1:5, more preferably 6:1 to 1:3. The molar ratio of Ti:Al can be e.g. between 10:1 to 1:4, preferably 5:1 to 1:3, more preferably 3:1 to 1:2. Furthermore, in case Compound (a) is prepared by contacting the Mg hydrocarbyl with an alcohol, suitably in a molar ratio of Mg:$R^1OH$ between 1:1 to 1:4, e.g. 1:1 to 1:3.5, such as 1:1.5 to 1:3.1.

As mentioned above, the catalyst particles can be used as such or together with a separate cocatalyst and/or an electron donor, as a Ziegler-Natta catalyst for the (co)polymerisation of an olefin in a manner known in the art. It is also possible to combine said catalyst with one or more other ZN and/or non-ZN catalysts.

The present invention further relates to a process for the production of an olefin (co-)polymer in which olefin monomers are (co-)polymerised in the presence of the catalyst of the invention.

Further, the present invention relates to the polymers produced in the presence of the catalysts of the present invention.

Preferably, in the process an ethylene (co-)polymer is produced, more preferably, ethylene monomers are copolymerised with one or more alpha-olefin comonomers units.

The alpha-olefin comonomer units of polyethylene resin preferably are selected from $C_3$- to $C_{20}$-alpha-olefins, more preferably are selected from $C_3$- to $C_{12}$-alpha-olefins, still more preferably $C_4$- to $C_{10}$-alpha-olefins, such as 1-butene, isobutene, 1-pentene, 1-hexene, 4-methyl-1-pentene, 1-heptene, 1-octene, 1-nonene, 1-decene and 1-eicosene, as well as dienes, such as butadiene, 1,7-octadiene and 1,4-hexadiene, or cyclic olefins, such as norbornene, and any mixtures thereof. Most preferably, the comonomer is 1-butene and/or 1-hexene.

If a copolymer is produced, the comonomer content can vary in wide ranges depending on the desired polymer properties. One benefit of the present invention is that due to the improved comonomer distribution reasonably high comonomer contents are possible without affecting some other properties, like XS, by selecting the ligand type among of all possible ligands in a correct way. I.e. the present invention really gives possibilities in tailoring the properties. Thus, the comonomer content, if present, in a single polymer or polymer fraction, can be vary from very low levels, as example from below 0.1 wt. % up to very high amounts, like at least up to 30 wt. % or above. In addition, polymer with wide range of MFR can be produced, e.g. from $MFR_2$ from 0.1 to 2000 g/10 min to $MFR_{21}$ from 0.01 to 100 g/10 min. (190° C., 2.16 and 21 kg load, respectively)

The desired MFR and density values, which are dependent on the desired end product to be produced, can be adjusted by hydrogen and comonomer as is well known to the man skilled in the art.

The polymerisation process of the present invention may be conducted as any polymerisation method including solution, slurry and gas phase polymerisation or any combinations thereof. The polymerisation process can be a single or multistage process including a two stage process.

In a preferred process of the invention ethylene monomers are polymerized together with one or more types of alpha-olefin comonomers, in the presence of the polymerisation catalyst described above under polymerisation conditions.

Preferably, in the process of the invention a bi- or a multimodal resin, is produced, whereof at least one fraction is an ethylene copolymer comprising one or more types of alpha-olefin comonomer units.

A multimodal, e.g. at least bimodal, polymer resin which comprises at least two polymer components (i) and (ii) with differing MW and MWD and/or with differing comonomer contents, may be produced by blending each or part of the components in-situ during the polymerisation process thereof (so called in-situ process) or, alternatively, by blending mechanically two or more separately produced components in a manner known in the art.

It is also possible to produce a multimodal polymer resin in one reactor by selecting e.g. one or more of the following: (1) changing polymerisation conditions, (2) using at least two different catalysts and (3) using at least two different comonomer feeds.

However, the bi- or multimodal resin preferably is produced in a multistage process using one or more polymerisation reactors, which may be the same or different, e.g. at least slurry-slurry, gas phase-gas phase or any combination of slurry and gas phase polymerisations. Each stage may be effected in parallel or sequentially using same or different polymerisation method. In case of sequential stages each component may be produced in any order by carrying out the polymerisation in each step, except the first step, in the presence of the polymer component formed in the preceding step(s).

It is possible that an ethylene homopolymer is produced in a first step and copolymerization is carried out in the subsequent step, or ethylene copolymers are produced in each step with the same or different comonomer amounts and types.

Preferably, also the catalyst used in the preceding steps is present in the subsequent polymerisation step(s). Alternatively, further catalyst, which can be the same or different than that used in the preceding step, can be added in the subsequent step(s).

Preferably, at least one component of the bi- or multimodal resin is produced in a slurry process. Such slurry process may be carried e.g. in a slurry reactor, preferably in a loop reactor. In case of two components one is produced in a slurry reactor and the other one is preferably produced by gas phase polymerization in a gas phase reactor.

In one embodiment, the process for producing the polymer composition comprising at least an ethylene copolymer fraction and, optionally, an ethylene homo- or an other ethylene copolymer component comprises the steps of:

(a) polymerising in a slurry reactor zone, preferably a loop reactor, ethylene monomers, with or without one or more comonomers, preferably alpha-olefin comonomers, in the presence of a polymerisation catalyst to produce the first polymer component, and, in case a homopolymer is produced in step a), transferring the reaction product of step (a) to a subsequent gas phase reactor zone (step b)). If ethylene copolymer is produced in step a) transferring to step b) is optional, depending on the desired properties of the final polymer.

(b) polymerising in a gas phase reactor zone ethylene monomers, optionally together with one or more comonomers, in the presence of the reaction product of step (a) to produce a second polymer component for obtaining the polymer composition of the invention, and recovering the obtained composition.

A preferred multistage process for producing ethylene (co)polymers is a "loop-gas phase"-process, such as developed by Borealis (known as BORSTAR® technology) described e.g. in patent literature, such as in EP 517 868.

If the polymer composition is multimodal at least with respect to the molecular weight distribution (MWD), then the lower molecular weight (LMW) component and the higher molecular weight (HMW) component are made in different steps (a) and (b), in any order. The LMW fraction is preferably produced in step (a) and the HMW fraction is produced in a subsequent step (b) in the presence of component obtained from step a).

Optionally, the process can further comprise a prepolymerisation step in a manner known in the field, which prepolymerisation step may precede e.g. step (a).

The process of the invention is preferably a continuous process.

The conditions for the slurry reactor, preferably loop reactor, e.g. that of step (a) may be as follows:
- a diluent is used, which diluent can be an aliphatic hydrocarbon, in a manner known in the art,
- the temperature is within the range of 40° C. to 110° C., preferably between 60° C. and 100° C. or 70-110° C.,
- the pressure is within the range of 20 bar to 80 bar, preferably between 30 bar to 70 bar,
- hydrogen can be added for controlling the molar mass in a manner known per se, (e.g. preferably 100 to 900 mols of H2/kmols of ethylene)
- the residence time is typically 0.5 to 5 hours, the reaction mixture from the slurry (loop) reactor is transferred to the gas phase reactor, i.e. to step (b), in a known manner and conditions in step (b) are preferably as follows:
- the temperature is within the range of 50° C. to 130° C., preferably between 60° C. and 115° C.
- the pressure is within the range of 10 bar to 60 bar, preferably between 10 bar to 40 bar,
- hydrogen can be added for controlling the molar mass in a manner known per se, (e.g. preferably 0 to 50 mols of H2/kmols of ethylene)
- the residence time is typically 1 to 8 hours The properties of the polymer composition can be further adjusted or controlled in a known manner e.g. with one or more of the following process parameters: hydrogen feed, comonomer feed, monomer feed in the gas phase reactor, catalyst and split between components. As it is well known, the adjustment of MFR value to a desired level may be effected during the polymerisation process by adjusting and controlling the process conditions, e.g. by regulating the molecular weight of the polymerisation product using a molecular weight regulator, e.g. hydrogen. The above described process of the invention enables highly feasible means for producing and further tailoring the polymer composition.

If desired, the polymerisation may be effected in a known manner under supercritical conditions in the slurry, preferably loop reactor, and/or as a condensed mode in the gas phase reactor.

The gas phase polymerisation may be conducted in a manner known in the art, such as in a fluidised bed or in an agitated bed. Also fast fluidisation may be utilised.

After the polymer is collected from the reactor and the hydrocarbon residues are removed therefrom, the polymer can be compounded and extruded to pellets. In this process step, any extruder known in the art may be used.

Before the extrusion the polymer may be mixed with the desired additives.

Figure 2:
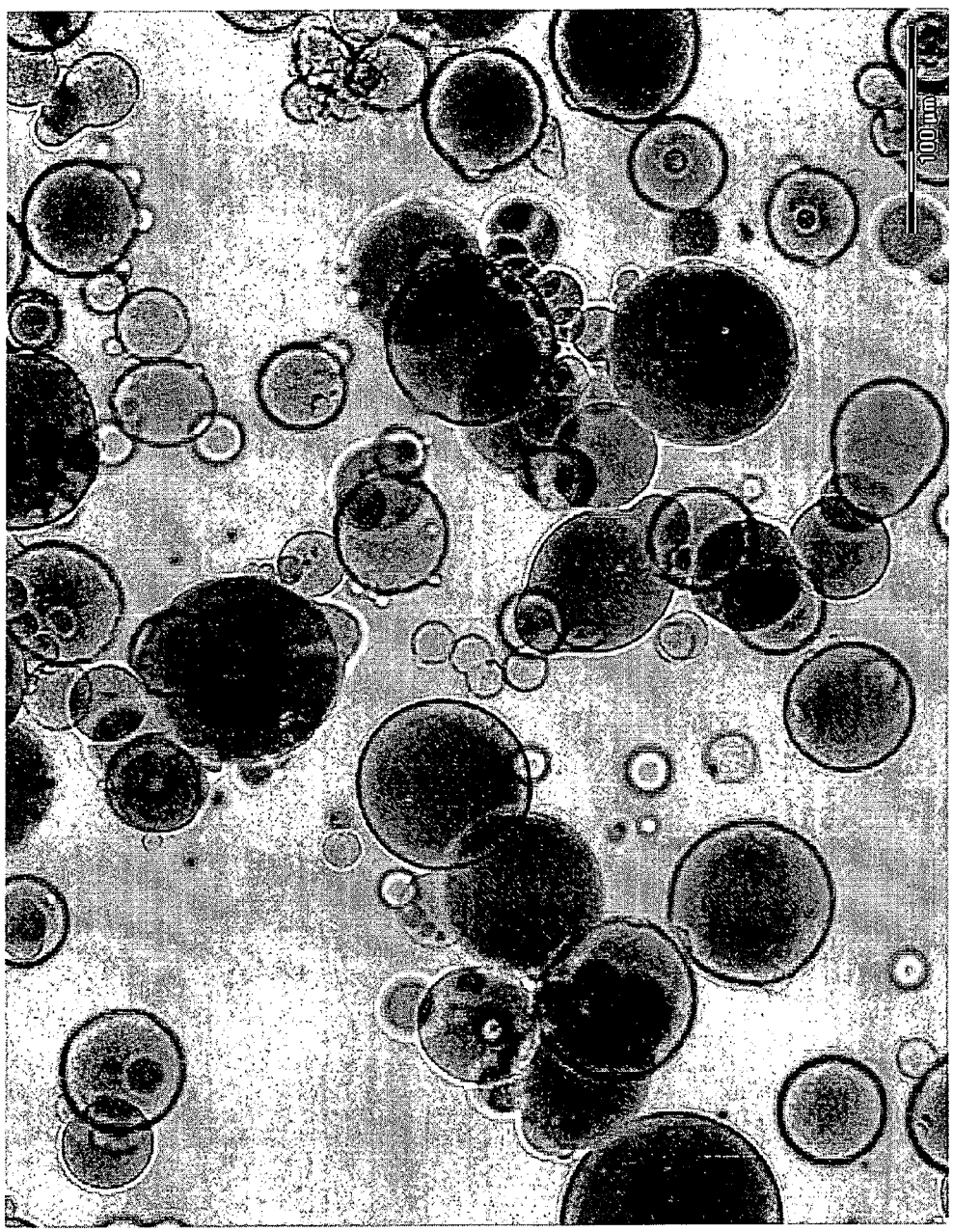
Figure 3:
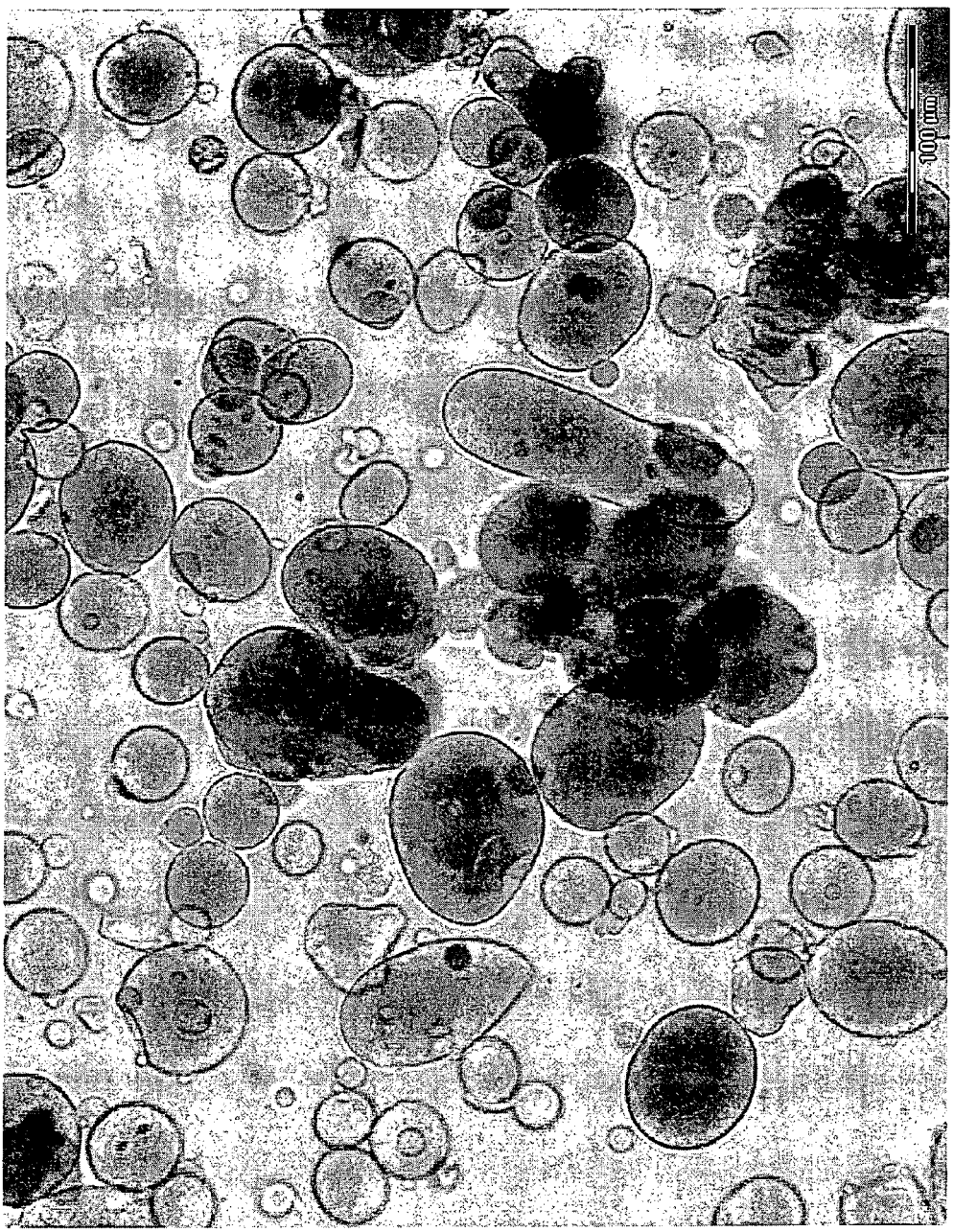
Figure 4:
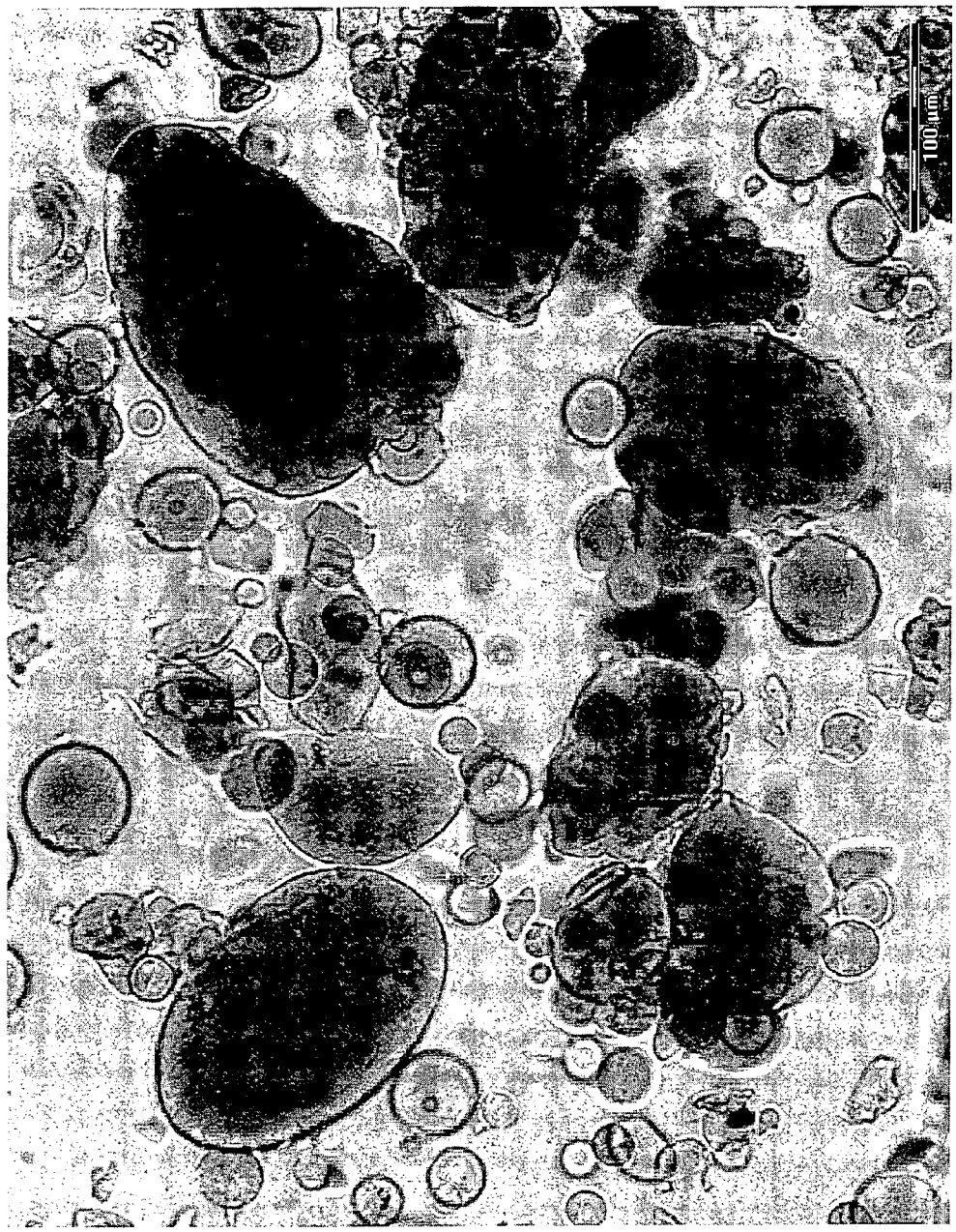

The invention is now described in more detail in the following non-limiting examples by reference to the figures, which display:

FIG. 1: Catalyst dispersion phase 18 vol. % of Example 10.
FIG. 2: Catalyst dispersion phase 47 vol. % of Example 11.
FIG. 3: Catalyst dispersion phase 56 vol. % of Example 12.
FIG. 4: Catalyst dispersion phase 64 vol. % of Example 13.

EXPERIMENTAL AND EXAMPLES

1. Definitions and Measurement Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer and the molecular weight. The MFR is determined at 190° C. for polyethylene. It may be determined at different loadings such as 2.16 kg ($MFR_2$), 5 kg ($MFR_5$) or 21.6 kg ($MFR_{21}$).

b) Molecular Weight and Molecular Weight Distribution

Average molecular weights and molecular weight distribution were determined by size exclusion chromatography (SEC) using Waters Alliance GPCV2000 instrument with on-line viscometer. Oven temperature was 140° C. Trichlorobenzene was used as a solvent.

c) Density

Density of the polymer was determined according to ISO 1183-1987.

d) Xylene Solubles (XS) Content 2.0 g of polymer is dissolved in 250 ml p-xylene at 135° C. under agitation. After 30 minutes, the solution is allowed to cool for 15 minutes at ambient temperature and then allowed to settle for 30 minutes at 25° C. The solution is filtered with filter paper into two 100 ml flasks.

The solution from the first 100 ml vessel is evaporated in nitrogen flow and the residue is dried under vacuum at 90° C. until constant weight is reached.

$$XS\% = (100 \times m_1 \times v_0)/(m_0 \times v_1)$$

$m_0$=initial polymer amount (g)
$m_0$=weight of residue (g)
$v_0$=initial volume (ml)
$v_1$ volume of analysed sample ml)
f) Crystallinity $X_c$: ISO 11357
g) TREF and CDBI
TREF Experiments The solubility distribution was measured using column of length 15.0 cm and 0.8 cm inner diameter which was filled with Cromosorb P silica and immersed in temperature programmable oil bath. The bath was stirred very vigorously to minimize temperature gradients within bath. About 7.5 to 12.5 mg of polymer was placed in a 4 ml glass vessel. 2.5 ml of xylene solvent was then added to the sample vessel, where it was stirred and heated at 140° C. for 2 to 4 hours to obtain polymer solution of about 3 to 5 mg/ml solution. This solution (2.5 ml) was then charged via syringe into packed column thermostated at high temperature, 135° C.

The polymer solution in the column was subsequently crystallized by cooling the column to 15° C. at cooling rate 1,5° C./min. The elution state was then begun by pumping pure TCB (1,2,4-trichlorobenzene) solvent, preheated to the temperature of oven, through the column. In elution stage pure TCB solvent was pumped through the column from 20° C. to 130° C. at flow rate of 0.5 ml/min for 5.5 h. The temperature was then programmed upward at the rate of 0.4° C./min to 130° C. Effluent from the column passes through a heated line to IR detector which was used to measure the absorbance effluent stream. The absorbance of the polymer carbon-hydrogen stretching bands at about 2925 $cm^{-1}$ serves as a continuous measure of relative weight percent concentration of the polymer in the effluent. Absorbance was measured in 1° C. intervals. After passing through the infrared detector the temperature of effluent was reduced to about 130° C. A solubility distribution curve, i.e. a plot of weight fraction of polymer solubilized as a function of temperature, was thus obtained.

CDBI calculations are based on the patent EP 0 598 848 B1.

By definition the CDBI index represents the weight percent of copolymer molecules having a comonomer content within 50% (i.e. +50) of the median total molar comonomer content.

The CDBI is calculated from the composition distribution curve (obtained by TREF) and the normalised cumulative integral of the composition distribution curve. The CDBI of the copolymer corresponds to the difference between the values of the cumulative integral at composition 0.5 Cmed and 1.5 Cmed. The median composition, Cmed, corresponding to the composition (in terms of weight %) at the point where the cumulative integral equals 0.5.

h) Comonomer Content

Comonomer content of the obtained products was measured with Fourier transform infrared spectroscopy (FTIR) calibrated with $^{13}$C-NMR.

2. Preparation of the Catalyst

Preparation of Mg Complex 40 kg of Bomag (butyloctylmagnesium 20% solution in toluene) was fed to a reactor. 12.4 kg of 2-ethylhexanol (2-EHA) was slowly added on BOMAG. 2-EHA had been earlier dried with molecular sieves. 2-ethylhexanol/Mg ratio was 2. The reaction temperature was kept below 45° C. The solution was mixed for 30 minutes and cooled to room temperature.

Catalysts for producing polyethylene resins of the invention were prepared in two different ways:
a) Catalyst Type (A)

Examples 1, 2, and 4 to 9

80 ml of perfluorooctyl (PFO) was added into a catalyst preparation reactor in a fume hood. $N_2$ was bubbled through the solvent for 10 minutes.

The targeted amount of the ligand ($Cp_2Mg$, IndLi, FluLi, 2,3-$Me_2$ $CpOSiMe_2$-tBuLi or CpLi) was weighted into a septa bottle and mixed with 4.9 ml of ethyl aluminium dichloride (25 wt-% in toluene). The mixture was stirred overnight in a glove box.

In the following day 10.2 ml of the Mg complex prepared above was added into a 100 ml septa bottle in a glove box. Ethyl aluminium dichloride/ligand solution was slowly added on the complex and mixed with a magnetic stirrer for 20 minutes. 0.38 ml of TiCl$_4$ was added slowly. This solution was then added to PFO solvent. The mixing speed was 450 rpm. After addition, the mixing speed was increased to 650 rpm and stirred for 5 minutes. 0.48 ml of surfactant (3-(perfluorooctyl)-1,2-propenoxide, 97 wt % solution) was added.

The emulsion was heated to 75° C. and mixed for 1 hour at that temperature.

The catalyst was allowed to settle for 10 minutes at 75° C. and the PFO was siphonated off. The catalyst was washed with 70 ml of heptane at 75° C. for 10 minutes and then extra heptane was siphonated off. This washing step was repeated.

The catalyst was then dried at 50° C. for 15 minutes.

b) Catalyst Type (B)

Example 3

80 ml of perfluorooctyl (PFO) was added into catalyst preparation reactor in a fume hood. N$_2$ was bubbled through the solvent for 10 minutes.

The targeted amount of the ligand (IndLi, FluLi, 2,3-Me$_2$ CpOSiMe$_2$-tBuLi or CpLi) was weighted into a septa bottle and mixed with 4.9 ml of ethyl aluminium dichloride (25 wt-% in toluene). The mixture was stirred overnight in a glove box.

In the following day 10.2 ml of the Mg complex prepared as above was added into a 100 ml septa bottle in a glove box. Ethyl aluminium dichloride/ligand solution was slowly added on the complex and mixed with a magnetic stirrer for 20 minutes. 0.48 ml of surfactant (3-(perfluorooctyl)-1,2-propenoxide, 97 wt % solution) was added into PFO. The Al-ligand solution was then added to PFO solvent. The mixing speed was 650 rpm. Then, 0.38 ml of TiCl$_4$ was added. After addition the mixture stirred for 10 minutes.

The emulsion was heated to 75° C. and mixed for 1 hour at that temperature. The catalyst was allowed to settle for 10 minutes at 75° C. and the PFO was siphonated off. The catalyst was washed with 70 ml of heptane at 75° C. for 10 minutes and then extra heptane was siphonated off. This washing step was repeated.

The catalyst was then dried at 50° C. for 15 minutes.

Catalyst of the comparative example 3 was prepared as catalyst A, but no ligand compound was added to the mixture.

Catalyst of comparative example 1 is a conventional SiO$_2$ based Ziegler-Natta type catalyst which corresponds to the one used in EP 6887794, Example 3.

Catalyst of the comparative example 2 is a commercial MgCl$_2$ based Ziegler-Natta based catalyst Lynx 200™ catalyst as manufactured and supplied by Engelhard Corporation, Pasadena, USA.

3. Copolymerisation of Ethylene and 1-butene

Polymerisations were carried out in 3 l stainless steel autoclave reactor equipped with a stirrer and continuous supply of ethylene.

1800 ml of i-butane was added into the reactor at room temperature. The temperature was then increased to 85° C. 40 mg of the catalyst and 0.95 ml of triethyl aluminium (20 wt-% solution in heptane) was added into the reactor. Al/Ti mol-ratio of the polymerisation was 20. Hydrogen (1-3 bars/500 ml cylinder) and 150-200 ml of 1-butene were flushed to the polymerization reactor. In the first experimental series (results in table 1) the H$_2$ and comonomer content was varied, since the target was to produce polymer with similar Mw and density. In the second series (results in table 2) the comonomer feed was kept constant. The ethylene partial pressure was 5 bar and the total pressure 22.5 bar. The total pressure was kept constant with a continuous ethylene feed. The polymer amount produced was always kept constant, 200 g of polymer was produced in polymerisation. Polymerisation time was dependent on the activity.

4. Polymerisation Results and Polymer Analysis

In Tables 1 and 2 below the catalyst and polymerisation results are disclosed.

Table 1 shows clearly the effects of ligands on polymer properties, like XS, MWD etc. It can also be seen that by using different type of ligands and/or by changing the amount of it the polymer properties can be tailored.

Table 2 shows the benefits of using ligands in polymerisation point of view. It can e.g. be seen that by using the same amount of comonorner feed in polymerisation, the properties of polymer can be improved compared to the catalyst without any ligand modification.

TABLE 1

| | Comp 1 | Comp 2 | Comp 3 | 1 | 2 | 3 | 4 | 5 | 6 |
|---|---|---|---|---|---|---|---|---|---|
| catalyst | Commercial SiO$_2$ supported ZN catalyst | Commercial MgCl$_2$ based catalyst | Reference | CpLi | IndLi | IndLi, B-type recipe | FluLi | Cp$_2$Mg | 2,3-Me$_2$CpOSi-Me$_2$tBuLi |
| Catalyst preparation type | | | | A | A | B | A | A | A |
| Lig/Ti mol/mol | no ligand | no ligand | no ligand | 0.48 | 0.27 | 0.28 | 0.28 | 0.31 | 0.10 |
| Comonomer, ml/C4 | 150 | 100 | 150 | 150 | 200 | 200 | 200 | 180 | 150 |
| Al/Ti mol/mol | 20 | 20 | 20 | 20 | 20 | 20 | 20 | 20 | 20 |
| H$_2$ (bar/500 ml) | 1 | 3 | 1 | 1 | 2 | 2 | 2 | 3 | 1 |
| Activity/wet (kg/g cat/h) | 5.35 | 51 | 11.1 | 9.3 | 5.1 | 2.6 | 6.5 | 8.1 | 5.8 |
| MFR$_2$ (g/10 min) | 0.56 | | 1.32 | 0.75 | 0.7 | 0.4 | 1.7 | 0.5 | 0.4 |
| MFR$_5$ (g/10 min) | 1.65 | 2.1 | 4.4 | 2.2 | 1.9 | 1.2 | 5.1 | 1.5 | 1.3 |
| MFR$_{21}$ (g/10 min) | 19.3 | 23.1 | 44.3 | 18.2 | 17.4 | 11.3 | 43.5 | 18.9 | 12.2 |
| Comonomer content (wt-%) | 4.6 | 5.5 | 5.1 | 3.5 | 4.3 | 4.0 | 4.8 | 5.6 | 3.3 |
| Density (kg/m$^3$) | 924.8 | 926.0 | 924.5 | 927.0 | 923.7 | 923.3 | 925.0 | 921.1 | 926.4 |
| M$_w$ | 170000 | 158000 | 122000 | 136000 | 157000 | 163000 | 119000 | 153000 | 165000 |
| M$_n$ | 37500 | 28.900 | 24100 | 38500 | 41200 | 47600 | 30600 | 25500 | 45100 |
| MWD | 4.5 | 5.5 | 5 | 3.5 | 3.8 | 3.4 | 3.9 | 6 | 3.7 |
| XS (wt. %) | 4.2 | 7.5 | 4.6 | 1.0 | 1.0 | 0.6 | 1.8 | 4.2 | 0.4 |
| Xc (%) | 34.4 | 44.4 | 40.2 | 45.0 | 45.8 | | 47.6 | 37.9 | 45.3 |
| CDBI (%) | 35 | 26 | 43 | 45 | 53 | 49 | 49 | 46 | 47 |

TABLE 2

| | Comp 1 | Comp 3 | Ex 1 | Ex 7 | Ex 8 | Ex 9 | Ex 6 |
|---|---|---|---|---|---|---|---|
| catalyst | Commercial SiO$_2$ supported ZN catalyst | Reference | CpLi | IndLi | FluLi | Cp$_2$Mg | 2,3-Me$_2$CpOSi-Me$_2$tBuLi |
| Catalyst preparation type | | | A | A | A | A | A |
| Lig/Ti mol/mol | no ligand | no ligand | 0.48 | 0.27 | 0.28 | 0.31 | 0.10 |
| Comonomer, ml/C4 | 150 | 150 | 150 | 150 | 150 | 150 | 150 |
| Al/Ti mol/mol | 20 | 20 | 20 | 20 | 20 | 20 | 20 |
| H$_2$ (bar/500 ml) | 1 | 1 | 1 | 1 | 1 | 1 | 1 |
| Activity/wet (kg/g cat/h) | 5.35 | 11.1 | 9.3 | 7.2 | 7.4 | 11.5 | 5.8 |
| MFR$_2$ (g/10 min) | 0.56 | 1.32 | 0.75 | * | 0.58 | * | 0.4 |
| MFR$_5$ (g/10 min) | 1.65 | 4.4 | 2.2 | 0.5 | 1.6 | 0.3 | 1.3 |
| MFR$_{21}$ (g/10 min) | 19.3 | 44.3 | 18.2 | 4.6 | 14.8 | 3.6 | 12.2 |
| Comonomer content (wt-%) | 4.6 | 5.1 | 3.5 | 3.3 | 3.5 | 4.2 | 3.3 |
| Density (kg/m$^3$) | 924.8 | 924.5 | 927.0 | 924.5 | 926.8 | 923.1 | 926.4 |
| M$_w$ | 170000 | 122000 | 136000 | 200000 | 158000 | 238000 | 165000 |
| M$_n$ | 37500 | 24100 | 38500 | 59900 | 36900 | 45300 | 45100 |
| MWD | 4.5 | 5 | 3.5 | 3.3 | 4.3 | 5.3 | 3.7 |
| XS (wt. %) | 4.2 | 4.6 | 1.0 | 0.4 | 0.5 | 1.3 | 0.4 |
| Xc (%) | 34.4 | 40.2 | 45.0 | 43.5 | 47.4 | 40.7 | 45.3 |
| CDBI (%) | 35 | 43 | 45 | 48 | 46 | 43 | 47 |

To show the effect of the proportion of the dispersed phase on the catalyst yield, the following examples have been conducted.

Examples 10 to 13

Corresponds to the Procedure B, as Disclosed Above 70 ml of perfluorooctyl (PFO) was added into catalyst preparation reactor in a fume hood. N$_2$ was bubbled through the solvent for 10 minutes. 3.7 ml of toluene was added on PFO and mixed for 24 hours.

The Mg-complex was prepared at catalyst scale-up-pilot. 40.00 kg butyloctylmagnesium (Bomag, 20% solution in toluene) was fed to a reactor. 12.37 kg of 2-ethylhexanol (2-EHA) was slowly added on BOMAG. 2-EHA had been earlier dried with molecular sieves. 2-EHA/Mg ratio was 2. The reaction temperature was kept below 45° C. The solution was mixed for 30 minutes and cooled to RT.

115.7 mg of Indenyl lithium was weighted into a septa bottle and mixed with 4.9 ml of EADC (25% in toluene). The mixture was stirred overnight in a glove box.

In the following day 8.72 g of the complex was added into a 100 ml septa bottle in a glove box (A). EADC/ligand solution was slowly added on the complex and mixed with a magnetic stirrer for 20 minutes (B). 0.38 ml of surfactant (3-(perfluoroctyl)-1,2-propenoxide, 97 wt % solution) was added into PFO. The solution B was then added to PFO solvent. The mixing speed was 650 rpm and reaction time 20 minutes. Then, 0.5 ml of TiCl$_4$ was added (C). After addition the mixture stirred for 10 minutes.

The emulsion was heated to 75° C. and mixed for 1 hour at that temperature. The catalyst was allowed to settle for 10 minutes at 75° C. and the PFO was siphonated off. The catalyst was washed with 70 ml of heptane at 75° C. for 10 minutes and then extra heptane was siphonated off. This washing step was repeated.

The catalyst was then dried at 50° C. for 20 minutes.

The proportion of the dispersed phase was 18 vol.-% in this example.

The proportion of the dispersed phase was increased to 47%, 56% and 64% by using the following amounts of components:

| Example | 10 | 11 | 12 | 13 |
|---|---|---|---|---|
| PFO/toluene/ml | 70/3.4 | 70/3.4 | 50/2.4 | 35/1.7 |
| Mg-complex/g | 8.72 | 34.88 | 34.88 | 34.88 |
| EADC/ml | 4.9 | 19.6 | 19.6 | 19.6 |
| IndLi/mg | 0.1157 | 0.4628 | 0.4628 | 0.4628 |
| TiCl$_4$/ml | 0.5 | 2.0 | 2.0 | 2.0 |

TABLE 3

Effect of increased catalyst dispersion phase to yield

| Catalyst | Dispersion phase, % | Yield, % | Yield improved, % |
|---|---|---|---|
| Ex 10 | 18 | 22.1 | 0 |
| Ex 11 | 47 | 35.0 | 58.7 |
| Ex 12 | 56 | 65.4 | 196.6 |
| Ex 13 | 64 | 39.9 | 81.0 |

Yield % = (amount of the chemicals added)g/(amount of catalyst yielded)g.
Yield improved e.g. (Example 11) = (1 − 35.0/22.1)*100 = 58.7%

Particle size distribution of catalyst particles was good and at least satisfactory for catalysts of examples 10, 11 and 12. However, PSD of catalyst of example 13 was clearly broader showing a bigger amount of small particles.

The invention claim is:

1. A Ziegler-Natta catalyst comprising a solid, ligand-modified catalyst component comprising
   (a) a compound of Group 1 to 3 of the Periodic Table (IUPAC),
   (b) a transition metal compound of Group 4 to 10 of the Periodic Table (IUPAC), or a compound of an actinide or lanthanide,
   (c) one or more organic ligand compound(s) selected from organic compounds comprising a cyclopentadienyl anion backbone, and
   (d) a compound of Group 13 of the Periodic Table, wherein the catalyst component of said Ziegler-Natta catalyst is formed in an emulsion/solidification method.

2. The Ziegler-Natta catalyst according to claim 1 wherein the cyclopentadienyl anion is selected from a substituted or unsubstituted cyclopentadienyl, a substituted or unsubstituted indenyl or a substituted or unsubstituted fluorenyl compound.

3. The Ziegler-Natta catalyst according to claim 1 wherein the molar ratio of ligand to transition metal is 0.03 to 5.

4. The Ziegler-Natta catalyst according to claim 1 wherein compound (b) is a transition metal compound of Group 4 to 6 of the Periodic Table (IUPAC), and compound (d) is an organoaluminium compound.

5. The Ziegler-Natta catalyst according to claim 1 wherein compound (a) is a magnesium compound, compound (b) is a chlorine-containing transition metal compound of Group 4 to 10 of the Periodic Table (IUPAC), compound (d) is an Al compound having the formula Al(alkyl)$_x$Cl3$_{3-x}$ where alkyl is an alkyl group of 1 to 12 carbon atoms, and $0 \leq x \leq 3$.

6. The Ziegler-Natta catalyst according to claim 1 wherein the preparation of the catalyst component comprises:
   i) preparing a common solution of compounds (a), (b) and (d) or separate solutions comprising one or more of compounds (a), (b) and (d),
   ii) dispersing said solution(s) in a solvent immiscible therewith and inert in relation to said compounds, to obtain an emulsion in which said solution(s) form(s) the dispersed phase in the form of droplets comprising compounds (a), (b) and (d),
   iii) solidifying the catalyst compounds in the dispersed droplets, and
   iv) adding one or more ligand compound(s) (c) which is/are selected from organic compounds comprising a cyclopentadienyl anion backbone at any stage of the preparation into the dispersed phase before or after the solidification step.

7. The Ziegler-Natta catalyst according to claim 1 wherein the preparation of the catalyst component comprises
   i) preparing a solution of the compound (a);
   ii) preparing a solution of compounds (d) and (c);
   iii) combining said two solutions with a solution of compound (b);
   iv) dispersing said obtained combined solution of (a), (b), (c) and (d) in the first solvent immiscible therewith and inert in relation to said compounds to obtain an emulsion in which said solutions form the dispersed phase;
   v) solidifying the catalyst component in the dispersed droplets;
   vi) optionally washing the solidified catalyst particles; and
   vii) recovering the solidified catalyst particles in solid form.

8. The Ziegler-Natta catalyst according to claim 1 wherein the preparation of the catalyst component comprises:
   i) preparing a solution from said compound (a);
   ii) preparing a solution of compound (d) and (c);
   iii) combining said solutions of compounds (a) and (d) with (c);
   iv) dispersing said combined solution of (a), (c) and (d) to the first solvent immiscible therewith and inert in relation to the compounds;
   v) adding a solution of compound (b) to the dispersed solution;
   vi) solidifying a catalyst component in the dispersed droplets;
   vii) optionally washing the solidified catalyst particles; and
   vii) recovering the solidified catalyst droplets in solid form.

9. The Ziegler-Natta catalyst according to claim 1 wherein the preparation of the catalyst component comprises
   i) preparing a common solution of compounds (a), (b) and (d) or separate solutions comprising one or more of compounds (a), (b) and (d);
   ii) dispersing said solution(s) to a first solvent immiscible therewith and inert in relation to said compounds, to obtain an emulsion in which said solution(s) form(s) the dispersed phase in the form of droplets;
   iii) solidifying the catalyst compounds in the droplets;
   iv) washing the solidified catalyst particles and adding the ligand compound (c) during the washing step; and
   v) recovering the solid catalyst component particles.

10. The Ziegler-Natta catalyst according to claim 9 wherein the dispersed phase forms a proportion of 15 to 65 vol. % of the total volume of the emulsion.

11. The Ziegler-Natta catalyst according to claim 10 wherein the dispersed phase forms a proportion of 18 to 60 vol. % of the total volume of the emulsion.

12. The Ziegler-Natta catalyst according to claim 11 wherein the dispersed phase forms a proportion of 18 to 50 vol. % of the total volume of the emulsion.

13. The Ziegler-Natta catalyst according to claim 1 wherein the preparation of the catalyst component comprises combining the organic ligand compound (c) with the Group 13 compound (d) into one solution which is added to the immiscible solvent at any step before recovery of the catalyst component.

14. A process for the production of a modified Ziegler-Natta catalyst wherein a component of said Ziegler-Natta catalyst is formed in an emulsion/ solidification process and an organic ligand originating from an organic ligand compound selected from organic compounds comprising a cyclopentadienyl anion backbone is incorporated into the catalyst component.

15. A ligand-modified Ziegler Natta catalyst obtainable by a process according to claim 14.

16. A process for the production of an olefin polymer which comprises polymerising alpha-olefin monomers in the presence of a catalyst according to claim 1.

17. The process according to claim 16 wherein the alpha-olefin monomers comprise ethylene monomers.

18. The process according to claim 17 wherein the alpha-olefin monomers comprise ethylene and one or more type(s) of other alpha-olefin comonomer(s).

19. The Ziegler-Natta catalyst according to claim 6, wherein the dispersed phase forms a proportion of 15 to 65 vol. % of the total volume of the emulsion.

20. The Ziegler-Natta catalyst according to claim 19, wherein the dispersed phase forms a proportion of 18 to 60 vol. % of the total volume of the emulsion.

21. The Ziegler-Natta catalyst according to claim 20, wherein the dispersed phase forms a proportion of 18 to 50 vol % of the total volume of the emulsion.

22. The Ziegler-Natta catalyst according to claim 7, wherein the dispersed phase forms a proportion of 15 to 65 vol. % of the total volume of the emulsion.

23. The Ziegler-Natta catalyst according to claim 22, wherein the dispersed phase forms a proportion of 18 to 60 vol. % of the total volume of the emulsion.

24. The Ziegler-Natta catalyst according to claim 23, wherein the dispersed phase forms a proportion of 18 to 50 vol. % of the total volume of the emulsion.

25. The Ziegler-Natta catalyst according to claim 8, wherein the dispersed phase forms a proportion of 15 to 65 vol. % of the total volume of the emulsion.

26. The Ziegler-Natta catalyst according to claim 25, wherein the dispersed phase forms a proportion of 18 to 60 vol. % of the total volume of the emulsion.

27. The Ziegler-Natta catalyst according to claim 26, wherein the dispersed phase forms a proportion of 18 to 50 vol. % of the total volume of the emulsion.

28. A process for the production of an olefin polymer which comprises polymerising alpha-olefin monomers in the presence of the catalyst according to claim 15.

29. The process according to claim 28 wherein the alpha-olefin monomers comprise ethylene monomers.

30. The process according to claim 29 wherein the alpha-olefin monomers comprise ethylene and one or more type(s) of other alpha-olefin comonomer(s).

* * * * *